(12) United States Patent
Saxena et al.

(10) Patent No.: US 10,742,509 B2
(45) Date of Patent: Aug. 11, 2020

(54) LOGICAL NETWORK CONFIGURATION SPAN

(71) Applicant: Nicira, Inc., Palo Alto, CA (US)

(72) Inventors: Aayush Saxena, San Jose, CA (US); Igor Ganichev, San Jose, CA (US); Da Wan, Beijing (CN); Pankaj Thakkar, Cupertino, CA (US); Yang Ping, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 474 days.

(21) Appl. No.: 15/342,776

(22) Filed: Nov. 3, 2016

(65) Prior Publication Data

US 2018/0123877 A1    May 3, 2018

(51) Int. Cl.
 *H04L 12/24* (2006.01)
(52) U.S. Cl.
 CPC .......... *H04L 41/12* (2013.01); *H04L 41/0813* (2013.01)
(58) Field of Classification Search
 CPC ....................................................... H04L 41/12
 See application file for complete search history.

(56) References Cited

U.S. PATENT DOCUMENTS

| | | | | |
|---|---|---|---|---|
| 2005/0201405 A1* | 9/2005 | Liu | ..................... | H04L 12/1881 370/432 |
| 2009/0216867 A1* | 8/2009 | Pusateri | ................ | H04L 41/022 709/222 |
| 2010/0165886 A1* | 7/2010 | Borrill | ..................... | H04L 45/02 |
| 2013/0094397 A1* | 4/2013 | Kim | ..................... | H04W 40/246 370/254 |
| 2013/0318228 A1* | 11/2013 | Raja | ....................... | G06F 3/0635 709/224 |
| 2013/0322299 A1* | 12/2013 | Choi | ..................... | H04L 12/462 370/256 |
| 2014/0258535 A1* | 9/2014 | Zhang | ................. | H04L 41/0806 709/226 |
| 2015/0009808 A1* | 1/2015 | Bejerano | ............. | H04L 41/0659 370/228 |
| 2017/0220697 A1* | 8/2017 | Wan et al. | .............. | H04L 67/10 |

* cited by examiner

*Primary Examiner* — Richard G Keehn
*Assistant Examiner* — Mohammed Ahmed
(74) *Attorney, Agent, or Firm* — Patterson + Sheridan, LLP (57) ABSTRACT

Certain embodiments described herein are generally directed to determining the spans of logical entities in a logical network using a graph theoretic method. For example, in some embodiments, a configuration of the logical network is represented as a directed graph with labeled edges. The span of any logical entity in the logical network may then be computed based on the directed graph of the logical network. For example, for a given entity represented by a given node, the set of nodes that can be reached from the given node via span-depends-on edges only may be computed and referred to as the span base of the given node. Further, the set of all managed forwarding elements reachable from each node of the span base of the given node via contains edges only is the span for the given entity.

25 Claims, 7 Drawing Sheets

LOGICAL NETWORK CONFIGURATION SPAN

BACKGROUND

Software-defined networking (SDN) often uses network controllers to configure logical networks throughout a datacenter. As SDN becomes more prevalent and datacenters cater to more and more tenants, controllers are expected to perform more operations. For example, a network controller may manage a plurality of managed forwarding elements (MFEs) (e.g., running on host machines, which are physical computing devices that support execution of virtual machines (VMs) or other virtualized computing instances) that implement one or more logical networks. The MFEs may implement various logical entities (e.g., logical routers, logical switches, etc.) of each logical network. A particular logical entity may be implemented on a subset of the MFEs managed by the controller. The controller may receive an update (e.g., change to the desired state) of the particular logical entity. Accordingly, the controller may need to determine the subset of MFEs that implement the logical entity (i.e., the span of the logical entity) to send the update so the logical entity can be updated.

SUMMARY

Herein described are one or more embodiments of a method for representing a logical network as a directed graph. The method includes defining nodes of the directed graph corresponding to a plurality of logical entities of the logical network. The method further includes defining a first set of directed edges of the directed graph between the nodes. A first edge of the first set of directed edges is formed between a first node comprising a source node of the first edge and a second node comprising a sink node of the first edge. The first edge indicates that a first logical entity corresponding to the first node contains a configuration information of a second logical entity corresponding to the second node. The method further includes defining a second set of directed edges of the directed graph between the nodes. A second edge of the second set of directed edges is formed between a third node comprising a source node of the second edge and a fourth node comprising a sink node of the second edge. The second edge indicates that a span of a third logical entity corresponding to the third node depends on a span of a fourth logical entity corresponding to the fourth node. The method further includes storing the directed graph in a central controller. The method further includes accessing the stored directed graph for managing a logical entity of the plurality of logical entities.

Also described herein are embodiments of a computer system, wherein software for the computer system is programmed to execute the method described above for representing a logical network as a directed graph.

Also described herein are embodiments of a non-transitory computer readable medium comprising instructions to be executed in a computer system, wherein the instructions when executed in the computer system perform the method described above for representing a logical network as a directed graph.

DETAILED DESCRIPTION

Embodiments presented herein relate to determining the spans of logical entities in a logical network using a graph theoretic method. For example, in some embodiments, a configuration of the logical network is represented as a directed graph with labeled edges, and the directed graph is used to manage logical entities including determining the spans of logical entities, as further described below.

Figure 1:
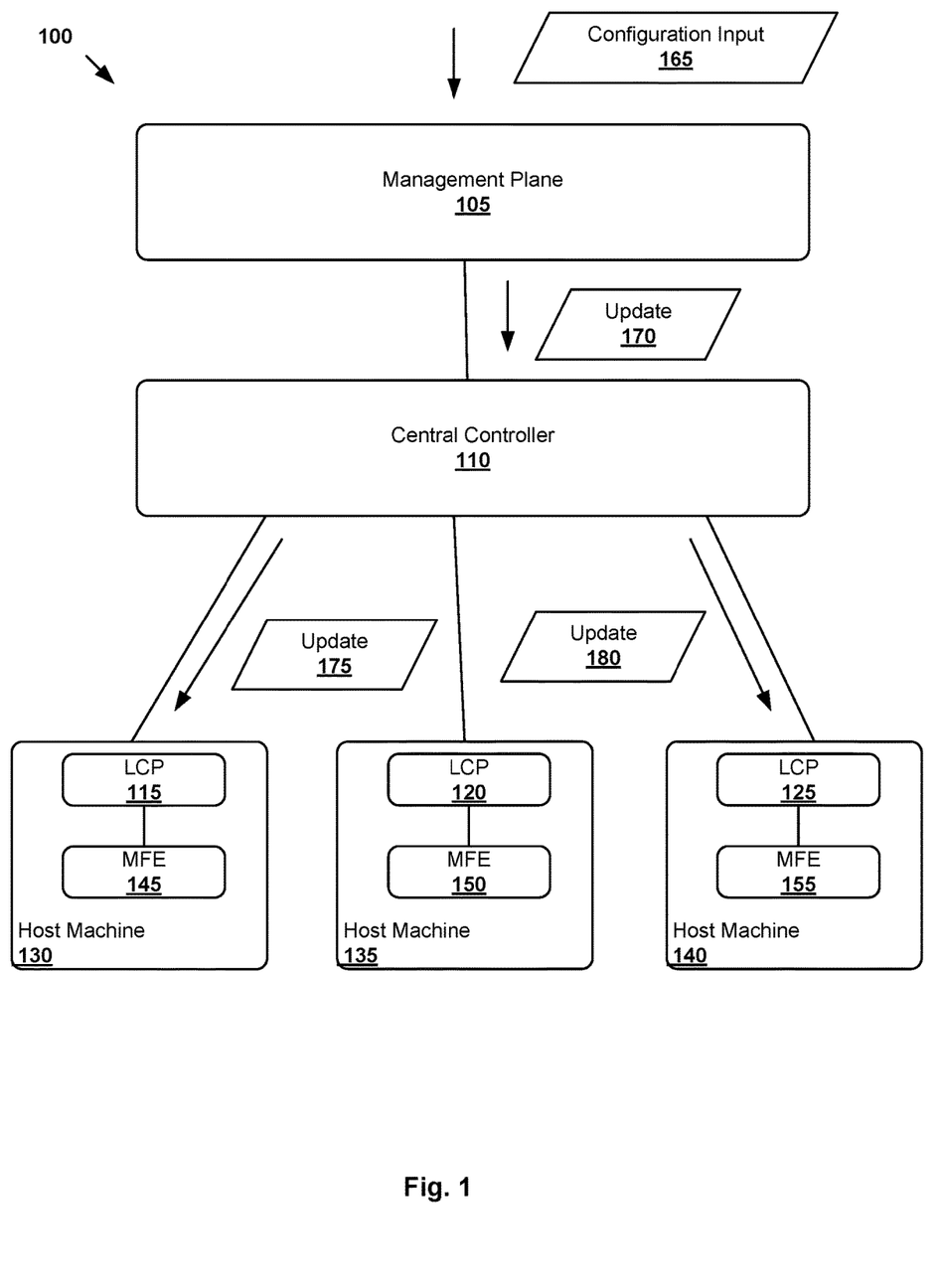
FIG. 1 is a block diagram of a network control system for a virtual network.

FIG. 1 is a block diagram of a network control system 100 including a central controller 110 (i.e., a network controller) that implements embodiments described herein. As shown, network control system 100 includes a management plane 105, a central controller 110, and multiple local controllers (also called the local control plane (LCP)) 115-125 that operate on host machines 130-140. In addition, each of host machines 130-140 includes a managed forwarding element (MFE) 145-155 that processes data traffic according to configuration information received from their respective controllers 115-125.

Though shown as a single entities, it should be understood that both management plane 105 and central controller 110 may be implemented as a distributed or clustered systems. That is, management plane 105 may include multiple computing devices that implement management plane functions, and a central control plane may include multiple central controller computers or virtual machines or containers (or other logical compute instances (including controller 110) that implement central control plane functions. In some embodiments, each centralized controller includes both management plane and central control plane functions (e.g., as separate applications or functions).

In some embodiments, management plane 105 is responsible for receiving logical network configuration inputs 165 (e.g., through an application programming interface). Users (e.g., network administrators) may input logical network configuration data through, e.g., a command-line interface, a graphical user interface, etc. Each logical network configuration for each logical network, in some embodiments, may include data defining one or more logical forwarding elements, such as logical switches, logical routers, etc. This configuration data may include information describing the logical ports (e.g., assigning media access control (MAC) and/or Internet protocol (IP) addresses to logical ports) for these logical forwarding elements, how the logical forwarding elements interconnect, various service rules (such as distributed firewall rules), etc. Each of these pieces of configuration data, including logical forwarding elements, logical ports, service rules, rule sets, etc., may be referred to as a logical entity.

Management plane 105 receives logical network configuration input 165 and generates desired state data that specifies how the logical network should be implemented in the physical infrastructure. In some embodiments, this data includes a description of the logical forwarding elements and logical ports in a uniform format (e.g., as a set of database records or another format). When users provide configuration changes (e.g., creating or deleting logical entities, modifying properties of logical entities, changing relationships between logical entities, etc.), the changes to the desired state are distributed as logical network updates 170 to central controller 110.

Figure 2:
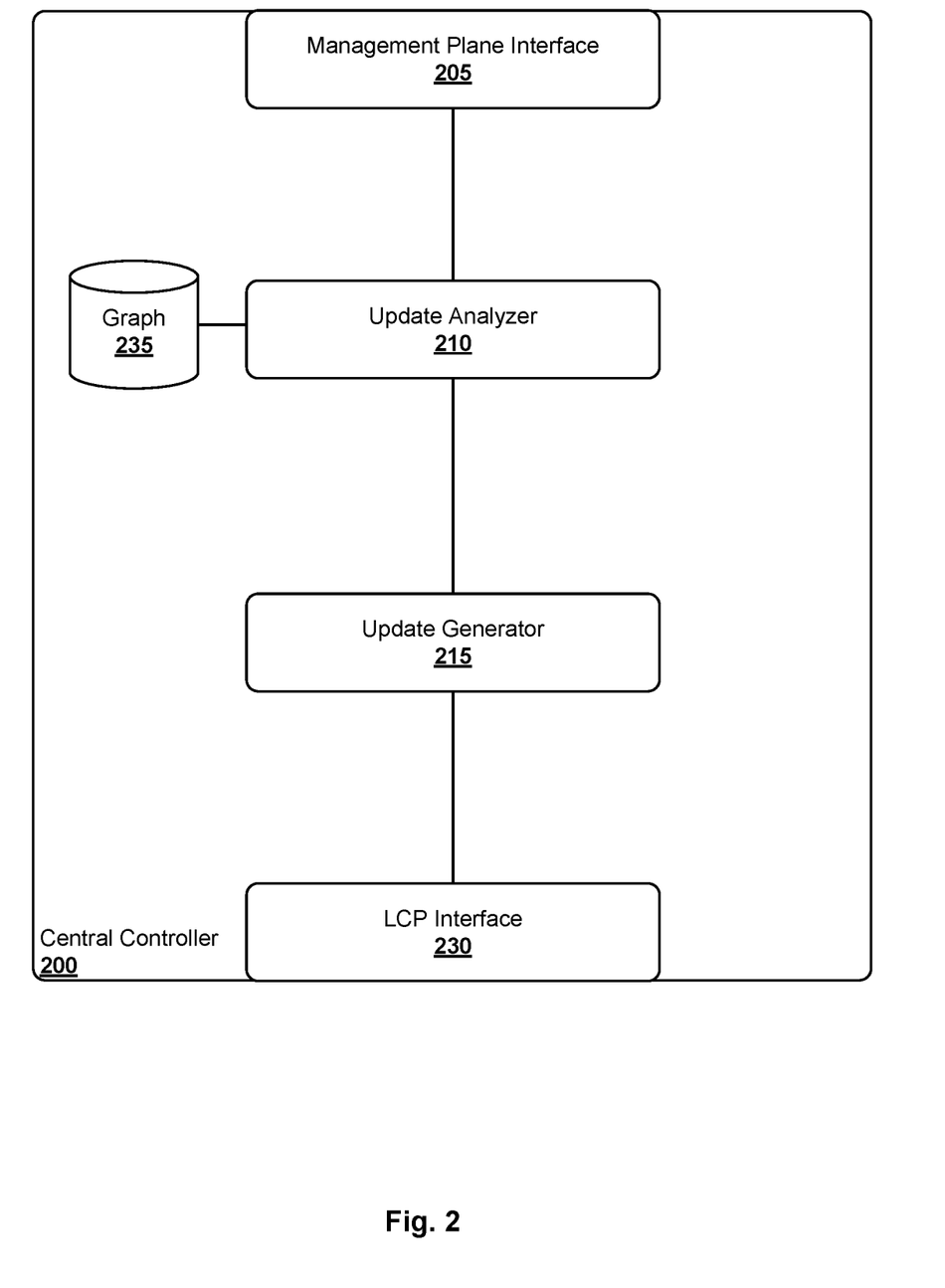
FIG. 2 is a block diagram of a central network controller of FIG. 1.

Central controller 110 receives updates 170 from management plane 105, and is responsible for distributing the updates to MFEs 145-155 that it manages (e.g., via local controllers 115-125). In some embodiments, central controller 110 is part of a central control plane cluster, with each controller in the cluster managing a different set of MFEs. Central controller 110 receives update 170 to the desired state and, determines the logical entities in the logical network that need to be updated based on update 170. Central controller 110 further determines, based on a directed graph of the logical network stored at central controller 110, a span of each of the logical entities to be updated, as further described below. Central controller 110 then generates state updates (e.g., updates 175 and 180) based on update 170 for the local controllers of the corresponding MFEs of the span of each logical entity to be updated, and sends the updates to the corresponding local controllers. For example, central controller 110 may determine that MFEs 145 and 155 need to be updated and sends updates 175 and 180 to local controllers 115 and 125, respectively. FIG. 2, described below, conceptually illustrates the architecture of a central controller of some embodiments.

In some embodiments, local controllers 115-125 are responsible for translating the received updates into configuration data formatted for their respective MFEs 145-155. In some embodiments, the local controller is a daemon that operates in the virtualization software of the host machine, as does the MFE. In other embodiments, the local controller and MFE may operate within a VM that hosts multiple containers for one or more logical networks. In some such embodiments, a first local controller and MFE operate in the virtualization software on the host machine while a second local controller and MFE operate in the container host VM (or multiple such controllers/MFE operate in multiple container host VMs).

In addition, while in some embodiments all MFEs in the physical infrastructure are of the same type (and thus require data in the same format), in other embodiments the physical infrastructure may include multiple different types of MFEs. For instance, some embodiments include both hosts with kernel virtual machine (KVM) virtualization software with a flow-based MFE (e.g., Open vSwitch) and hosts with ESX virtualization software with a feature-based MFE. Such different types of MFEs require different data formats from the local controller. As such, in some embodiments, local controllers 115-125 are configured to translate the received updates into the specific format required by their MFEs.

As mentioned, FIG. 2 conceptually illustrates the architecture of a central controller 200 of some embodiments, such as central controller 110 of FIG. 1. Central controller 200 includes a management plane interface 205, an update analyzer 210, an update generator 215, and a local control plane interface 230.

In addition, the central controller 200 stores (e.g., in volatile memory, such as RAM) one or more directed graphs 235 of the current state of one or more logical networks.

Management plane interface 205 handles interactions with the management plane. Central controller 200 receives changes in the desired state of one or more logical networks through this management plane interface 205.

Update analyzer 210 receives updates to the desired state and determines whether to generate or modify a directed graph 235. For example, if the received update is for a configuration for an entire new logical network that does not have a directed graph 235 stored at central controller 200, update analyzer 210 generates a directed graph 235 for the logical network based on the desired state information. Update analyzer 210 may then determine all the MFEs identified in the desired state information need to be updated.

If the received update is for a configuration update of an existing logical network that does have a directed graph 235 stored at central controller 200, update analyzer 210 determines the logical entities that need to be updated based on the received update and if directed graph 235 needs to be updated. For example, if the update includes an update to a relationship between logical entities, then directed graph 235 may need to be updated, otherwise directed graph 235 may not need to be updated. If needed, update analyzer 210 updates directed graph 235. Further, update analyzer 210 determines the span of each of the logical entities to be updated based on directed graph 235, as discussed further herein.

Update analyzer 210 informs update generator 215 of which MFEs as indicated by the determined spans need to be updated. Update generator 215 is responsible for distributing updates through local control plane interface 230 to the appropriate local controllers of the determined MFEs. In some embodiments, central controller 200 has a separate channel with each of the local controllers that it manages via local control plane interface 230.

Figure 3:
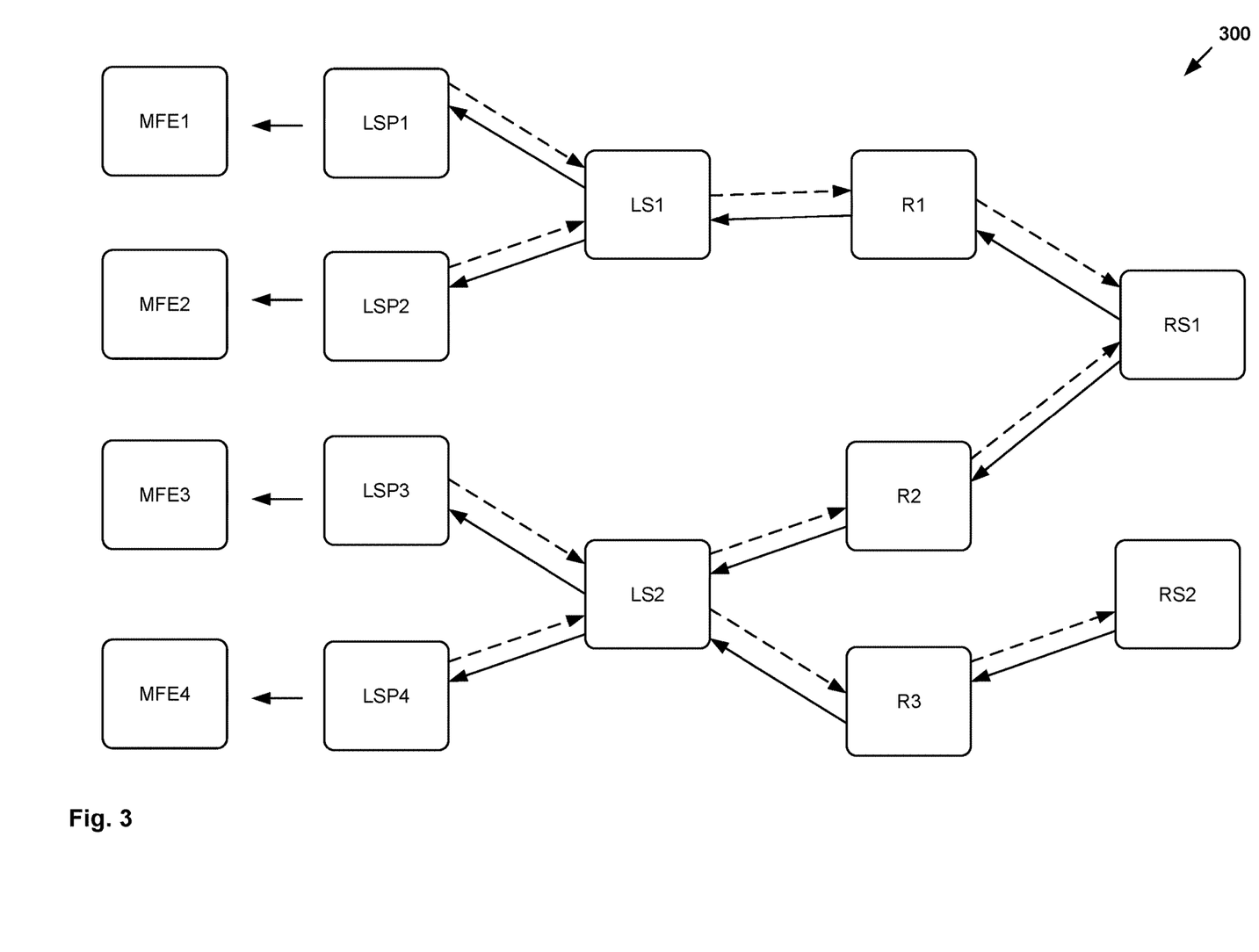
FIG. 3 illustrates an example of a directed graph for a logical network.

FIG. 3 is an illustration of an example of a directed graph 300 (e.g., directed graph 235) for a logical network.

In particular, the configuration for the logical network represented by directed graph 300 may indicate that a first logical switch port LSP1 is implemented on MFE1, LSP2 is implemented on a MFE2, LSP3 is implemented on MFE3, and LSP4 is implemented on MFE4. The configuration may further indicate a first logical switch LS1 includes LSP1 and LSP2, and LS2 includes LSP3 and LSP4. The configuration may further indicate that LS1 implements rules R1 and R2, and that LS2 implements R2 and R3. The configuration may further indicate that R1 and R2 belong to a first rule set RS1, and R3 belongs to RS2. Accordingly, each of LSP1, LSP2, LSP3, LSP4, LS1, LS2, R1, R2, R3, RS1, and RS2, are the logical entities of the logical network.

The nodes of directed graph 300 correspond to the logical entities LSP1-4, LS1-2, R1-3, and RS1-2 of the logical network. Further, the logical entities are shown at levels in directed graph 300 based on the type of the logical entity (e.g., logical switch port, logical switch, rule, rule set, etc.). For example, the logical entities may implement network functions corresponding to different layers of a network. For example, the term "layer-2" generally refers to a data link layer (e.g., Media Access Control (MAC) or Ethernet layer), "layer-3" to a network layer (e.g., Internet Protocol (IP) layer), and "layer-4" to a transport layer (e.g., Transmission Control Protocol (TCP) layer) in the Open System Interconnection (OSI) model, although the concepts described herein may be applicable to other networking models. Logical entities at lower layers, e.g., layer 2, may be positioned lower (e.g., as shown in FIG. 3, to the left) on directed graph 300. In some embodiments, only user-defined entities are included in directed graph 300 representing the logical network.

Further, directed graph 300 includes labeled edges between the nodes of directed graph 300. In particular, directed graph 300 includes two types of edges. The first type of edge is a "contains" type edge and is illustrated by a solid line. The second type of edge is a "span-depends-on" edge and is illustrated by a dashed line. Each type of edge is associated with a particular direction.

A contains type edge is formed between logical entities where the logical entity at the source node of the edge contains configuration information of the logical entity at the sink node of the edge. For example, as discussed, LS1 includes LSP1 and LSP2, so there is a contains edge from LS1 to LSP1 and another contains edge from LS1 to LSP2. Similarly, RS1 includes R1 and R2, so there is a contains edge from RS1 to R1 and another contains edge from RS1 to R2. In another example, R1 is implemented by LS1, so there is a contains edge from R1 to LS1.

A span-depends-on edge is formed between logical entities when the span of the entity at the source node of the edge must include the span of the entity at the sink node of the edge. For example, the span for a particular configuration may be defined based on a particular entity type. That particular entity type then may act an overall sink for the graph for the span-depends-on edges in its path. For example, in directed graph 300, the span is defined based on rule sets as the entity type. Therefore, RS1 and RS2 act as the overall sinks for directed graph 300. Thus, the span of LSP1 and LSP2 depend on the span of LS1 and there are span-depends-on edges shown accordingly. The span of LS1 depends on the span of R1, and the span of R1 depends on RS1 and there are span-depends-on edges shown accordingly.

In another example, if the span were defined based on rules as the entity type, then instead of the span of R1 depending on RS1, the span of RS1 would depend on R1. The span-depends-on edge between RS1 and R1 would then be reversed.

Figure 4:
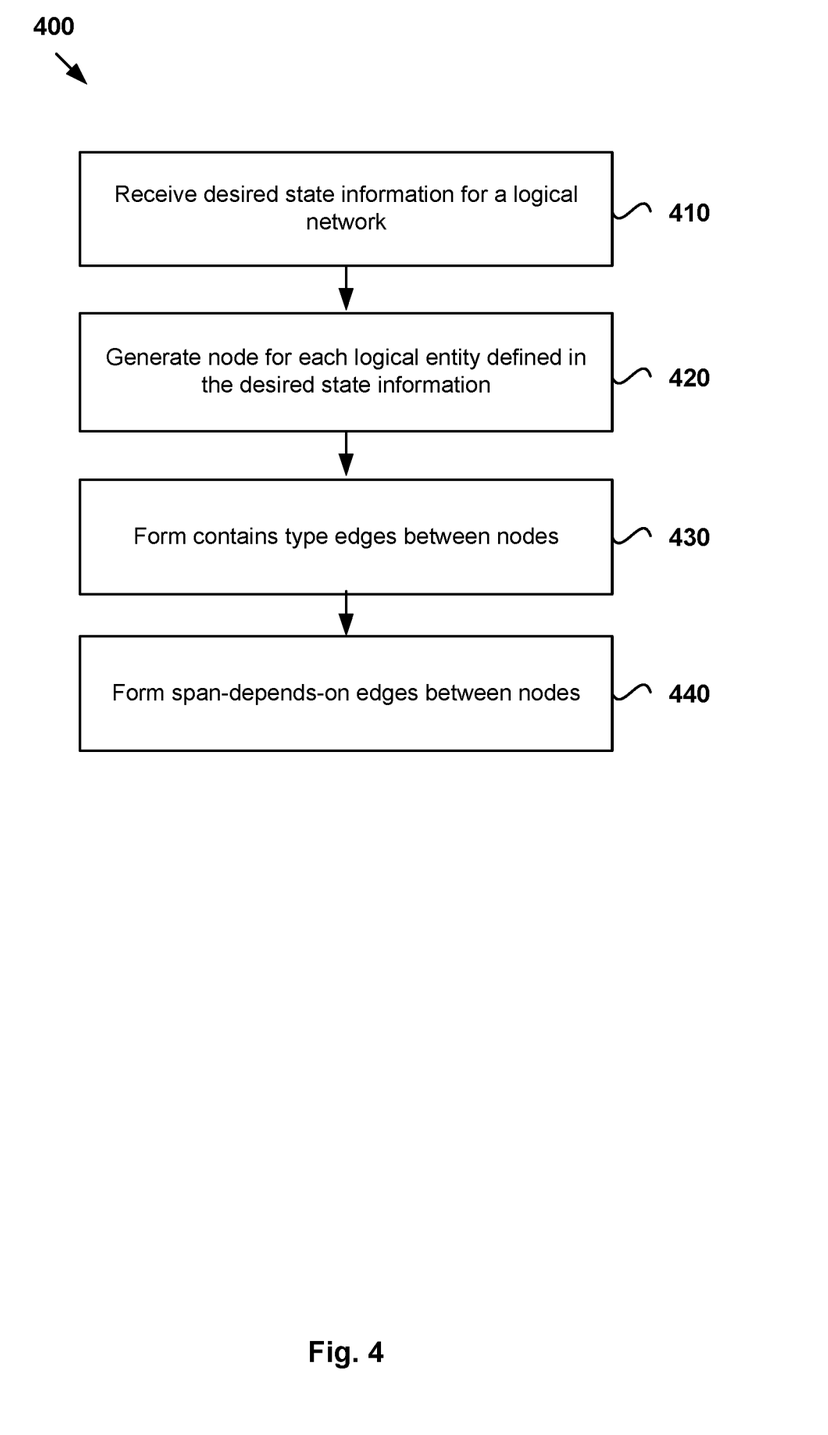
FIG. 4 illustrates example operations for generating a directed graph for a logical network.

As discussed, in some embodiments, update analyzer 210 generates directed graph 300. FIG. 4 conceptually illustrates example operations 400 for generating a directed graph for a logical network.

As shown, at 410, update analyzer 210 receives desired state information for a logical network from management plane 105. At 420, update analyzer 210 generates a node for each logical entity defined in the desired state information. Further, at 430, update analyzer 210 forms contains type edges for all pairs of nodes where the source node of the contains type edge contains configuration information of the sink node of the contains type edge. At 440, update analyzer 210 forms span-depends-on type edges for all pairs of nodes where the span of the source node of the span-depends-on type edge depends on the span of the sink node of the span-depends-on type edge.

Figure 5:
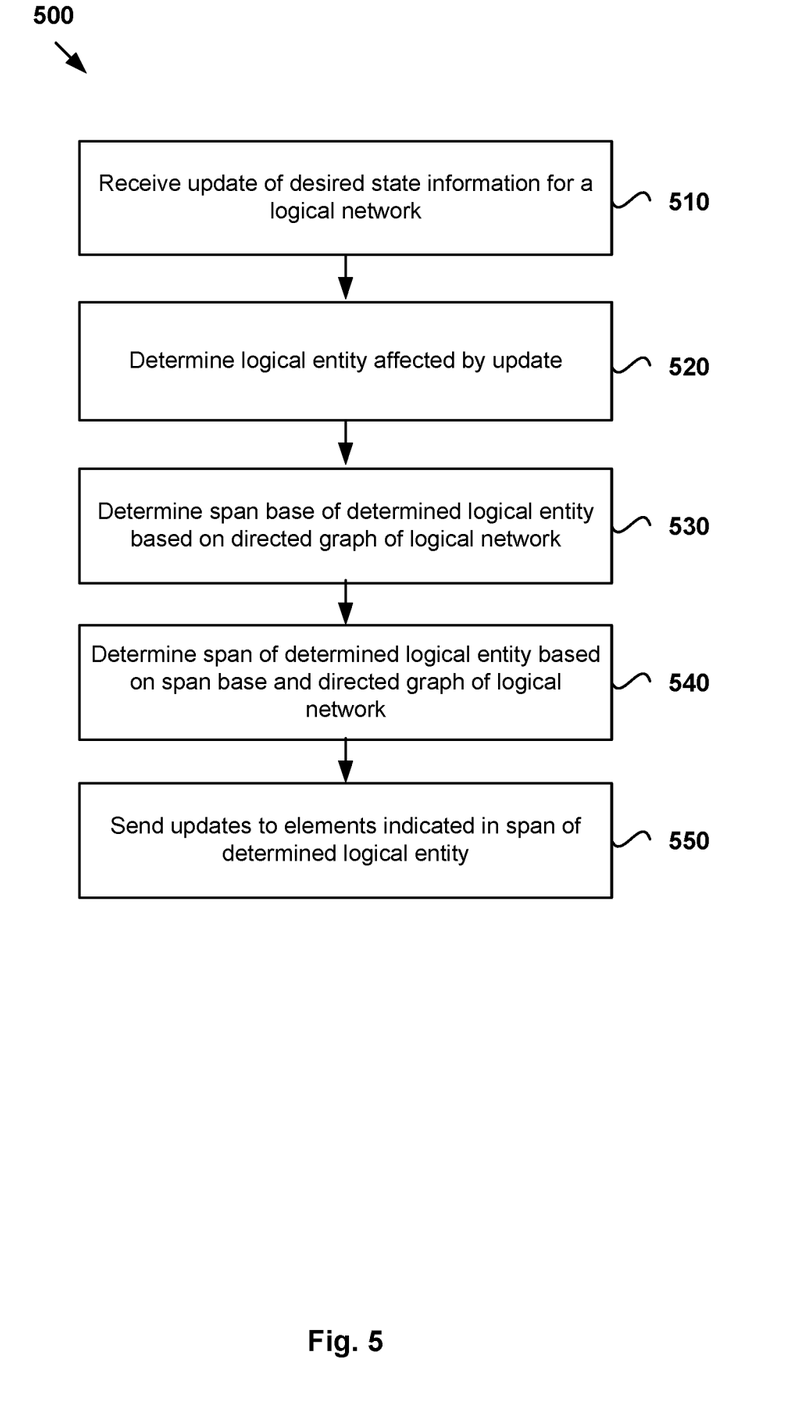
FIG. 5 illustrates example operations for updating MFEs based on a directed graph for a logical network.

Further, as discussed, update analyzer 210 may determine the span of a logical entity in the directed graph and update MFEs of the determined span. FIG. 5 conceptually illustrates example operations 500 for determining the span of a logical entity and updating MFEs based on a directed graph for a logical network. As shown, at 510, update analyzer 210 receives an update of desired state information for a logical network from management plane 105. The update indicates a change to a logical entity in the logical network. At 520, update analyzer 210 determines which logical entity is affected by the update. At 530, update analyzer 210 determines a span base of the determined logical entity based on a directed graph of the logical network. The span base of a logical entity is defined as the set of nodes that can be reached from the node representing the logical entity via span-depends-on edges only. For example, for LS1, the span base may be R1 and RS1.

At 540, update analyzer 210 determines the span for the logical entity as the set of all the MFEs reachable via contains edges only from any of the set of nodes of the span base of the logical entity. For example, as discussed, the span base of LS1 is R1 and RS1. From RS1, each of LSP1, LSP2, LSP3, and LSP4 are reachable via contains edges only. Further, LSP1, LSP2, LSP3, and LSP3 are implemented on MFE1-4, respectively. Therefore, the span of LS1 is all the MFEs MFE1-4. In another example, the span for R3 would be only MFE3 and MFE4. At 550, update generator 215 generates sends the update to the determined MFEs.

In some examples, it may not be necessary to determine which MFEs are reachable from each node of the span base. For example, if every MFE is already identified based on a subset of the nodes of the span base, the other nodes of the span base do not need to be checked. Further, in some embodiments, if certain nodes in the span base are coupled to higher level nodes that are also part of the span base (e.g., RS1 is coupled to R1), only the highest level node (e.g., leaf nodes, such as, RS1) of those nodes is used to determine which MFEs are reachable from each node.

In some embodiments, update analyzer 210 may store the information about which MFEs each logical entity in directed graph 300 is implemented on in association with the logical entity. Accordingly, once the span is calculated for an entity, the span does not need to be recomputed for every update, as long as directed graph 300 does not change. In particular, if update analyzer 210 receives an update to one of the logical entities, but the update does not change a relationship between logical entities that changes the directed graph 300, update analyzer 210 looks up the span of the updated logical entity and pushes the update to the related MFEs.

Figure 6:
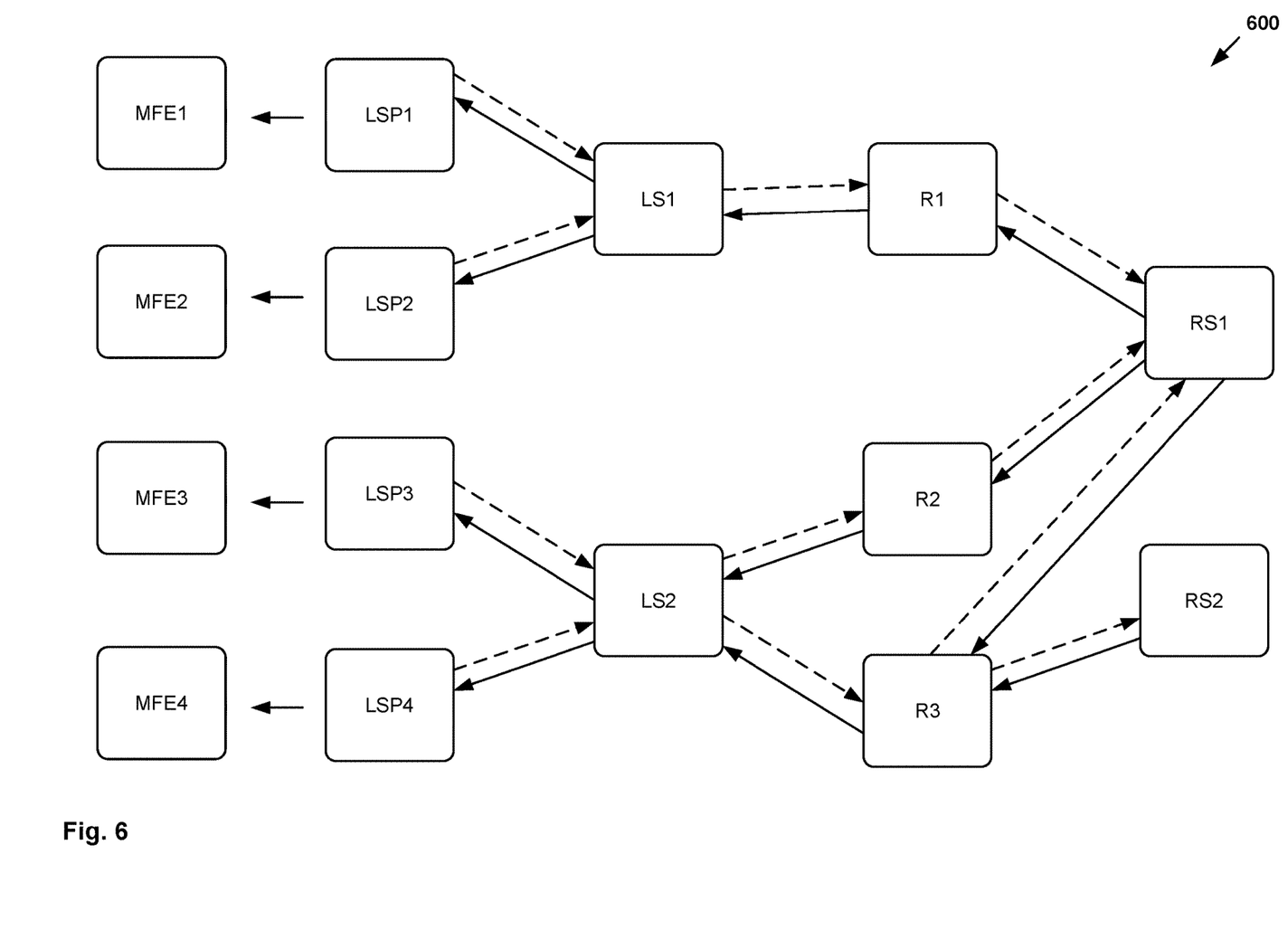
FIG. 6 illustrates an example of an updated directed graph of FIG. 3.
Figure 7:
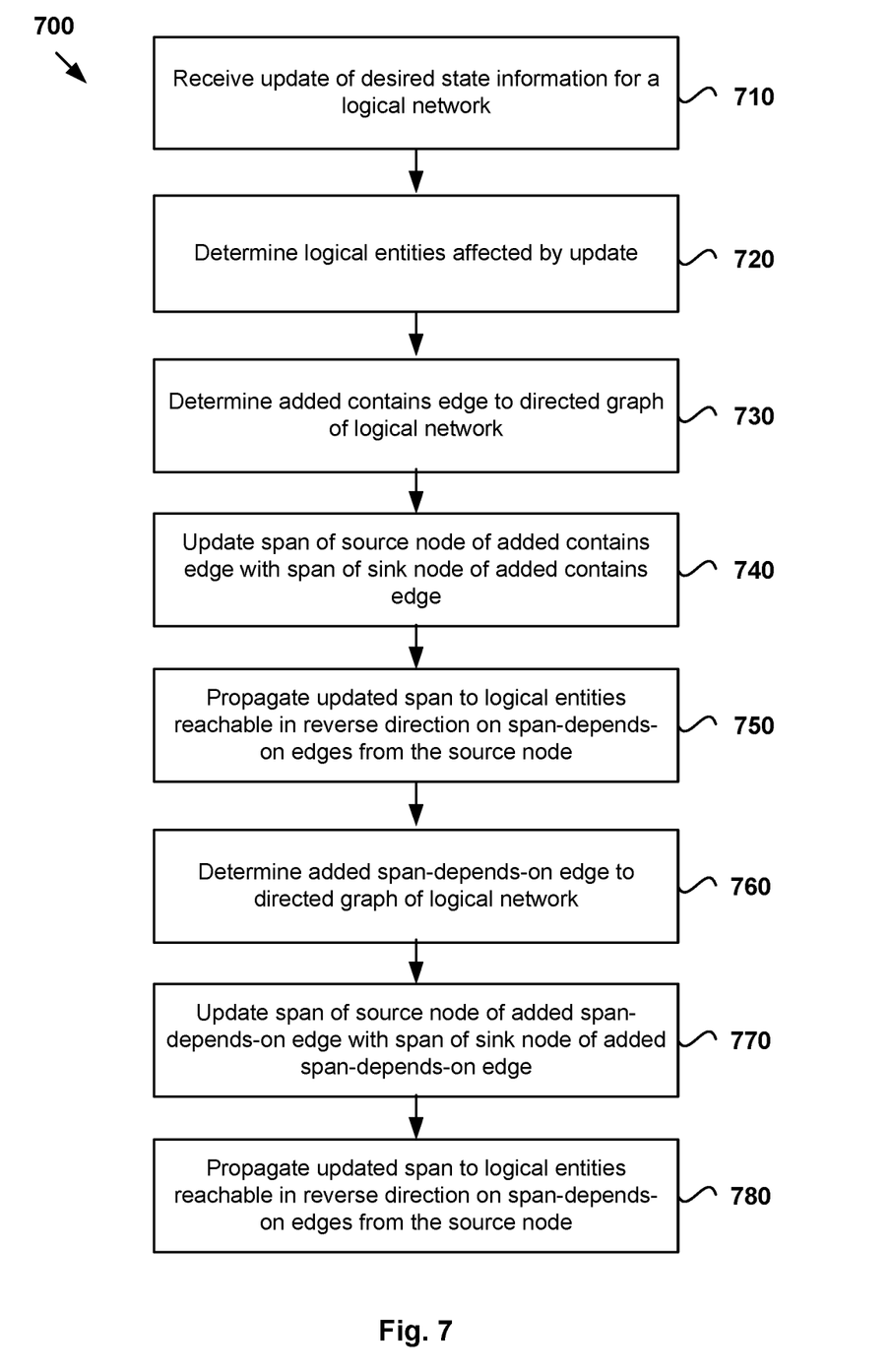
FIG. 7 conceptually illustrates example operations for updating a directed graph for a logical network.

In some embodiments, update analyzer 210 may receive an update that changes a relationship between logical entities represented by a directed graph and update the directed graph accordingly. For example, with respect to the logical network represented by directed graph 300, an update may add a relationship between R3 and RS1. Accordingly, update analyzer 210 may update directed graph 300 to generate updated directed graph 600, as shown in FIG. 6. Update analyzer 210 may further determine the spans of R3 and RS1 using updated directed graph 600 to determine the MFEs to update. FIG. 7 conceptually illustrates example operations 700 for updating a directed graph for a logical network as discussed.

As shown, at 710, update analyzer 210 receives an update of desired state information for a logical network from management plane 105. The update indicates a change to a relationship between logical entities in the logical network, such as the addition of the relationship between R3 and RS1 in this example. At 720, update analyzer 210 determines which logical entities are affected by the update, such as R3 and RS1 in this example. At 730, update analyzer 210 determines any added contains edge to the directed graph of the logical network. For example, as shown in updated directed graph 600, a contains edge is added between RS1 and R3. At 740, update analyzer 210 adds any MFEs in the span of the logical entity at the sink node of the added contains edge to the span of the logical entity at the source node of the added contains edge. For example, update analyzer 210 determines if the span (MFE3, MFE4) of the sink node R3 at the added contains edge includes any MFEs that are not included in the span (MFE1-4) of the source node RS1 at the added contains edge. Here, update analyzer 210 determines that there are no additional MFEs in the span of R3 as compared to the span of RS1, so the span of the logical entities in the directed graph 600 is not changed. At 750, update analyzer 210 further propagates addition of the MFEs to each additional logical entity (e.g., all shown logical entities in directed graph 600 except RS2) that is reachable in the reverse direction of span-depends-on edges from the source node of the added contains edge.

At 760, update analyzer 210 determines any added span-depends-on edge to the directed graph of the logical network. For example, as shown in updated directed graph 600, a span-depends-on edge is added between R3 and RS1. Update analyzer 210 may then determine if the span (MFE1-4) of the sink node RS1 at the added span-depends-on edge includes any MFEs that are not included in the span (MFE3, MFE4) of the source node R3 at the added span-depends-on edge. Here, update analyzer 210 determines that there are additional MFEs (MFE1, MFE2) in the span of RS1 as compared to the span of R3.

At 770, update analyzer 210 adds any MFEs in the span of the logical entity at the sink node of the added span-depends-on edge to the span of the logical entity at the source node of the added span-depends-on edge. Accordingly, update analyzer 210 adds the additional MFEs (MFE1, MFE2) to the span of R3. At 780, update analyzer 210 further propagates addition of the MFEs to each additional logical entity (e.g., LS2, LSP3, and LSP4) that is reachable in the reverse direction of span-depends-on edges from the source node of the added span-depends-on edge.

In some embodiments, the directed graph information stored at update analyzer 210 may not include information indicating an entity type for each node of the directed graph. For example, the directed graph may not indicate that a particular entity is a logical switch, logical switch port, rule, etc. Update analyzer 210, based on the procedures described, even without knowing the entity type, may still be able to determine which MFEs to update based on the directed graph information.

In some embodiments, update analyzer 210 may determine in what order to apply a plurality of updates to a logical network based on a directed graph, even if the directed graph does not include information indicating an entity type for each node of the directed graph. In particular, if updates are made to logical entities that are disjoint from one another (i.e., not coupled by edges and/or other logical entities to each other) then the updates could be applied in parallel. Further, if logical entities are not disjoint, updates may be applied in an order where updates to logical entities at lower levels of the graph are applied before logical entities at higher levels of the graph in order to minimize a number of hops of passing information for the update. The updates may be applied starting at the lower level entities and propagated to higher level entities based on the directed graph. Then, when a higher level entity where another update to be applied is reached, the updates may be batched and applied together at that entity, and the batched update may continue to be propagated based on the directed graph.

In some embodiments, the directed graph information stored at update analyzer 210 does include information indicating an entity type for each node of the directed graph. Update analyzer 210 may utilize this information to further optimize the updates applied to the logical network. For example, if there are multiple updates to be applied to logical entities, updates may be applied to lower level entities (e.g., lower layer entities such as logical switch ports) before higher level entities (e.g., higher layer entities such as rules) in order to minimize a number of hops of passing information for the update, as discussed.

The embodiments described herein may provide several advantages over other systems and methods for determining the span of logical entities. For example, another method of determining the span of an entity is for the controller to calculate the span of each logical entity in a logical network at the time that an update is to be applied to the entity. The network controller may take a snapshot of the configuration of the logical network, such as by locking the state of the entire logical network, computing the current configuration, storing the entire configuration, and then releasing the lock. This method is cumbersome and slow, requires additional storage space, and may be different for different controllers. By utilizing the systems and methods discussed herein, a current configuration of the logical network can always be maintained as a directed graph at the controller and entities can be updated with less cumbersome computation and without requiring the state of the logical network to be locked.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for representing a logical network as a directed graph, the method comprising:
    defining nodes of the directed graph corresponding to a plurality of logical entities of the logical network;
    defining a first set of directed edges of the directed graph between the nodes, wherein a first edge of the first set of directed edges is formed between a first node comprising a source node of the first edge and a second node comprising a sink node of the first edge, wherein the first edge indicates that a first logical entity corresponding to the first node contains a configuration information of a second logical entity corresponding to the second node;
    defining a second set of directed edges of the directed graph between the nodes, wherein a second edge of the second set of directed edges is formed between the second node comprising a source node of the second edge and the first node comprising a sink node of the second edge, wherein the second edge indicates that a span of the second logical entity corresponding to the second node depends on a span of the first logical entity corresponding to the first node;
    storing the directed graph; and
    accessing the stored directed graph for managing a logical entity of the plurality of logical entities.

2. The method of claim 1, wherein managing the logical entity comprises:
    determining a span of the logical entity of the plurality of logical entities based on the directed graph, determining the span comprising:
        determining a set of nodes reachable by only edges of the second set of directed edges from a node representing the logical entity; and
        determining managed forwarding elements reachable by only edges of the first set of directed edges from each of the set of nodes, wherein the span of the logical entity is the determined managed forwarding elements.

3. The method of claim 2, further comprising:
    receiving an update of the logical entity; and
    sending the update to the determined managed forwarding elements.

4. The method of claim 2, wherein the managed forwarding elements comprise host machines.

5. The method of claim 2, further comprising:
    determining a span of each of the plurality of logical entities; and
    storing the span of each of the logical entities.

6. The method of claim 2, further comprising storing an entity type for each of the plurality of logical entities.

7. The method of claim 1, further comprising determining an order to apply a plurality of updates to the logical network based on the directed graph.

8. The method of claim 1, wherein the logical entities comprise one or more of a logical switch port, a logical switch, a rule, and a rule set.

9. A computer system comprising at least one processor coupled with a memory, wherein the memory stores system software for the at least one processor to execute a method for representing a logical network as a directed graph, said method comprising:

defining nodes of the directed graph corresponding to a plurality of logical entities of the logical network;

defining a first set of directed edges of the directed graph between the nodes, wherein a first edge of the first set of directed edges is formed between a first node comprising a source node of the first edge and a second node comprising a sink node of the first edge, wherein the first edge indicates that a first logical entity corresponding to the first node contains a configuration information of a second logical entity corresponding to the second node;

defining a second set of directed edges of the directed graph between the nodes, wherein a second edge of the second set of directed edges is formed between the second node comprising a source node of the second edge and the first node comprising a sink node of the second edge, wherein the second edge indicates that a span of the second logical entity corresponding to the second node depends on a span of the first logical entity corresponding to the first node;

storing the directed graph; and accessing the stored directed graph for managing a logical entity of the plurality of logical entities.

10. The computer system of claim 9, wherein managing the logical entity comprises:

determining a span of the logical entity of the plurality of logical entities based on the directed graph, determining the span comprising:

determining a set of nodes reachable by only edges of the second set of directed edges from a node representing the logical entity; and determining managed forwarding elements reachable by only edges of the first set of directed edges from each of the set of nodes, wherein the span of the logical entity is the determined managed forwarding elements.

11. The computer system of claim 10, wherein the method further comprises:

receiving an update of the logical entity; and sending the update to the determined managed forwarding elements.

12. The computer system of claim 10, wherein the managed forwarding elements comprise host machines.

13. The computer system of claim 10, wherein the method further comprises:

determining a span of each of the plurality of logical entities; and storing the span of each of the logical entities.

14. The computer system of claim 10, wherein the method further comprises storing an entity type for each of the plurality of logical entities.

15. The computer system of claim 9, wherein the method further comprises determining an order to apply a plurality of updates to the logical network based on the directed graph.

16. The computer system of claim 9, wherein the logical entities comprise one or more of a logical switch port, a logical switch, a rule, and a rule set.

17. A non-transitory computer readable medium comprising instructions to be executed in a computer system, wherein the instructions when executed in the computer system perform a method for representing a logical network as a directed graph, the method comprising:

defining nodes of the directed graph corresponding to a plurality of logical entities of the logical network;

defining a first set of directed edges of the directed graph between the nodes, wherein a first edge of the first set of directed edges is formed between a first node comprising a source node of the first edge and a second node comprising a sink node of the first edge, wherein the first edge indicates that a first logical entity corresponding to the first node contains a configuration information of a second logical entity corresponding to the second node;

defining a second set of directed edges of the directed graph between the nodes, wherein a second edge of the second set of directed edges is formed between the second node comprising a source node of the second edge and the first node comprising a sink node of the second edge, wherein the second edge indicates that a span of the second logical entity corresponding to the second node depends on a span of the first logical entity corresponding to the first node;

storing the directed graph; and accessing the stored directed graph for managing a logical entity of the plurality of logical entities.

18. The computer readable medium of claim 17, wherein managing the logical entity comprises:

determining a span of the logical entity of the plurality of logical entities based on the directed graph, determining the span comprising:

determining a set of nodes reachable by only edges of the second set of directed edges from a node representing the logical entity; and determining managed forwarding elements reachable by only edges of the first set of directed edges from each of the set of nodes, wherein the span of the logical entity is the determined managed forwarding elements.

19. The computer readable medium of claim 18, wherein the method further comprises:

receiving an update of the logical entity; and sending the update to the determined managed forwarding elements.

20. The computer readable medium of claim 18, wherein the managed forwarding elements comprise host machines.

21. The computer readable medium of claim 18, wherein the method further comprises:

determining a span of each of the plurality of logical entities; and storing the span of each of the logical entities.

22. The computer readable medium of claim 18, wherein the method further comprises storing an entity type for each of the plurality of logical entities.

23. The computer readable medium of claim 17, wherein the method further comprises determining an order to apply a plurality of updates to the logical network based on the directed graph.

24. The computer readable medium of claim 17, wherein the logical entities comprise one or more of a logical switch port, a logical switch, a rule, and a rule set.

25. A computer comprising:

means for defining nodes of the directed graph corresponding to a plurality of logical entities of the logical network;

means for defining a first set of directed edges of the directed graph between the nodes, wherein a first edge of the first set of directed edges is formed between a first node comprising a source node of the first edge and a second node comprising a sink node of the first edge, wherein the first edge indicates that a first logical entity corresponding to the first node contains a configuration information of a second logical entity corresponding to the second node;

means for defining a second set of directed edges of the directed graph between the nodes, wherein a second edge of the second set of directed edges is formed between the second node comprising a source node of the second edge and the first node comprising a sink node of the second edge, wherein the second edge indicates that a span of the second logical entity corresponding to the second node depends on a span of the first logical entity corresponding to the first node;

means for storing the directed graph; and means for accessing the stored directed graph for managing a logical entity of the plurality of logical entities.

* * * * *